(12) United States Patent
Lieber et al.

(10) Patent No.: US 6,658,504 B1
(45) Date of Patent: Dec. 2, 2003

(54) STORAGE APPARATUS

(75) Inventors: Timothy Lieber, Colorado Springs, CO (US); Michael J. Hynes, Galway (IE); Hans O'Sullivan, Co. Wicklow (IE); Mike Stolz, Mendon, MA (US); Reuben M. Martinez, Colorado Springs, CO (US)

(73) Assignee: Eurologic Systems, Dublin (IE)

( * ) Notice: Subject to any disclaimer, the term of this patent is extended or adjusted under 35 U.S.C. 154(b) by 377 days.

(21) Appl. No.: 09/651,043

(22) Filed: Aug. 30, 2000

Related U.S. Application Data

(60) Provisional application No. 60/204,578, filed on May 16, 2000, and provisional application No. 60/204,593, filed on May 16, 2000.

(51) Int. Cl.[7] ............................................... G06F 12/00

(52) U.S. Cl. ............................ 710/52; 710/55; 710/58; 710/60; 370/228; 707/204; 714/4

(58) Field of Search ............................ 710/52, 55, 58, 710/60, 317; 370/228; 707/204; 714/4

(56) References Cited

U.S. PATENT DOCUMENTS

| | | | | |
|---|---|---|---|---|
| 5,959,972 A | * | 9/1999 | Hamami | 370/228 |
| 6,360,330 B1 | * | 3/2002 | Mutalik et al. | 714/4 |
| 6,480,927 B1 | * | 11/2002 | Bauman | 710/317 |
| 6,490,598 B1 | * | 12/2002 | Taylor | 707/204 |

* cited by examiner

Primary Examiner—Jeffrey Gaffin
Assistant Examiner—Mohammad O. Farooq
(74) Attorney, Agent, or Firm—Oppedahl & Larson LLP

(57) ABSTRACT

In a high-performance data storage system, an enclosure contains a multiplicity of disk drives, each of which has two high-speed serial data ports. Respective data lines are provided which connect each of the data ports with a respective high-speed data multiplexer. Importantly, each of the multiplexers is also connected with each of two distinct I/O modules. Failure of either I/O module still permits the remaining I/O module to have serial high-speed connectivity with each of the multiplexers, and thus with each of the data ports on each disk drive. Finally, the overall function of the system may be selected as JBOD (Just a Bunch Of Drives), as SAN (Storage Area Network), or NAS (Network Attached Storage), without requiring any mechanical or electronic change other than the I/O modules.

22 Claims, 6 Drawing Sheets

| 301 | 313 | 314 | 316 | 324 |
|-----|-----|-----|-----|-----|
| 302 | 313 | 315 | 317 | 325 |
| 303 | 313 | 315 | 318 | 326 |
| 304 | 313 | 315 | 319 | 327 |
| 305 | 313 | 315 | 320 | 328 |
| 306 | 313 | 315 | 321 | 329 |
| 307 | 313 | 314 | 322 | 330 |
| 308 | 313 | 315 | 323 | 331 |
| 309 | 313 | 315 | 323 | 332 |
| 310 | 313 | 315 | 323 | 333 |
| 311 | 313 | 315 | 323 | 334 |
| 312 | 313 | 315 | 323 | 335 |

FIG. 6

STORAGE APPARATUS

This application claims priority from U.S. patent application Ser. Nos. 60/204,578 entitled "Method for high availability and high functionality fibre channel storage enclosure" and 60/204,593 entitled "Storage IO option connector for maximum enclosure functionality", each filed May 16, 2000, each of which is hereby incorporated herein by reference to the extent permitted by law.

BACKGROUND

With the explosive growth of the Internet and with the growth of client-server systems in both business-to-business and business-to-consumer relationships, there has come to be a profound shift in business and consumer expectations regarding availability and reliability of servers and associated data. Historically many systems were batch-oriented, while nowadays systems are updated in real time. Historically many systems provided information to a small number of people who in turn interfaced with large numbers of people; nowadays customers and users expect to be able to obtain information themselves without having to speak to an intermediary. Historically, in batch-oriented systems, it was a straightforward matter to protect against single-point data loss by simply replicating files before or after the batch processing. In present-day systems where continual updating takes place, no single act of replication provides a complete solution to the problem of backups.

A number of approaches have been devised to deal with such needs. One approach, and historically the first approach, was to attempt to make an arbitrarily reliable disk drive or other storage mechanism. Such an approach is uneconomic, however, and even if cost were of no concern, there are natural upper limits on how reliable a particular storage device can be.

A different approach, called RAID (redundant array of independent disks) has proven to be a much better way to attempt to achieve high reliability in data storage. A RAID system will contain as many as about fourteen disk drives, tied together logically. Versions of RAID have been developed which store each item of data several times on each of several different physical drives. In this way, loss of a single physical drive need not result in loss of any data. Indeed, with appropriate software and system design, it is possible to protect against loss of two drives. Still other versions of RAID permit improved data latency, that is, a reduction in the interval between the time that an item of data is desired and the time that the item of data is retrieved.

Stated differently, RAID permits the use of several relatively inexpensive disk drives of non-perfect reliability, in a system which can be shown to be extremely reliable.

The above-mentioned advantages are found regardless of whether particular physical drives are permanently installed or are removable. But with further advances in hardware and software design, it has become possible for drives to be "hot-swappable", meaning that a drive or other system component can be removed while the system is operating, and replaced with a new unit. Under software control, the RAID system can offer seamless service while such swaps are taking place.

Given the many advantages of RAID systems, it is unsurprising that RAID systems have come into commercial use. In recent times the popularity of RAID systems has given rise to a great need for RAID systems of ever-greater capacity and storage density. There are competitive pressures to reduce the cost of RAID systems. Now that the logical function of a RAID system is well defined, attention has shifted to improving the enclosures and other infrastructure for the physical disk drives making up a RAID system.

Most RAID systems are rack-mounted, for example on industry-standard nineteen-inch racks. Each system is thus of a width to fit in the rack, and is of a height to accommodate the height of a disk drive. A plurality of disk drives are mounted in the system, parallel to each other and stacked to reach nearly the width of the rack.

One commonly used communications approach is called "fibre channel". A fibre channel communications line is a very high-speed serial data line. The data line may be optical fiber or may be a copper or other metallic serial data line. The fibre channel line may be a loop, thus having some historical similarity to token ring and having some of its advantages such as the absence of collisions (as is expected with ethernet). The fibre channel line may enter a fibre channel switch, in which case pairs of lines connected within the switch enjoy full bandwidth regardless of traffic on other pairs of lines. The fibre channel line uses protocols derived closely from SCSI protocols, thus simplifying system design for those who are familiar with SCSI protocols. Fibre channel loops can be very fast (rivaling gigabit ethernet in speed) and can pass data over distances of at least several thousand feet (thus far exceeding bus length limitations with SCSI buses).

While most disk drives encountered by consumers are designed for IDE or SCSI buses, it is commonplace for disk drives used in high-performance systems to use fibre channel communications. Indeed it is likewise commonplace for each disk drive to have two fibre channel communications ports. This permits higher reliability due to the redundancy of the two fibre channel connections; if one cable or communications line breaks the disk drive can still communicate through the other cable or communications line. Yet a failure that causes loss of connectivity to one of the loops (in some prior art systems) does often leave the system at risk since now the loss of the other loop will lose all connectivity.

While the availability of redundant fibre channel loops permits system function even in the event of loss of one of the fibre channel loops, current pressures to improve system reliability make it desirable to protect not only against single-point failures but also to offer protection against multipoint failures. It is also desirable to maintain connectivity to reach each of the two loops even in the event of any of a variety of single-point failures.

High-performance storage systems fall into a number of categories, including JBOD (Just a Bunch Of Drives), SAN (Storage Area Network), and NAS (Network Attached Storage). Historically these systems have been physically different in many ways, including different enclosures, different motherboards, and different hardware. It has historically been necessary to manufacture and stock a variety of piece parts to provide all of these categories in a high-performance product line. It is desirable to provide a system topology and architecture that permits keeping almost everything the same (mechanically and electronically) and requiring only a change of an I/O module to change the function from JBOD to SAN or NAS.

SUMMARY OF THE INVENTION

In a high-performance data storage system, an enclosure contains a multiplicity of disk drives, each of which has two high-speed serial data ports. Respective data lines are provided which connect each of the data ports with a respective high-speed data multiplexer. Importantly, each of the multiplexers is also connected with each of two distinct I/O modules. Failure of either I/O module still permits the remaining I/O module to have serial high-speed connectivity with each of the multiplexers, and thus with each of the data ports on each disk drive. Finally, the overall function of the system may be selected as JBOD (Just a Bunch Of Drives), as SAN (Storage Area Network), or NAS (Network Attached Storage), without requiring any mechanical or electronic change other than the I/O modules.

DESCRIPTION OF THE DRAWING

The invention will be described with respect to a drawing in several figures, of which:

FIG. 6 shows a preferred pinout for the I/O connectors of slots 23 or 24.

Where possible, like elements in the figures have been shown with like reference designations.

DETAILED DESCRIPTION

Figure 1:
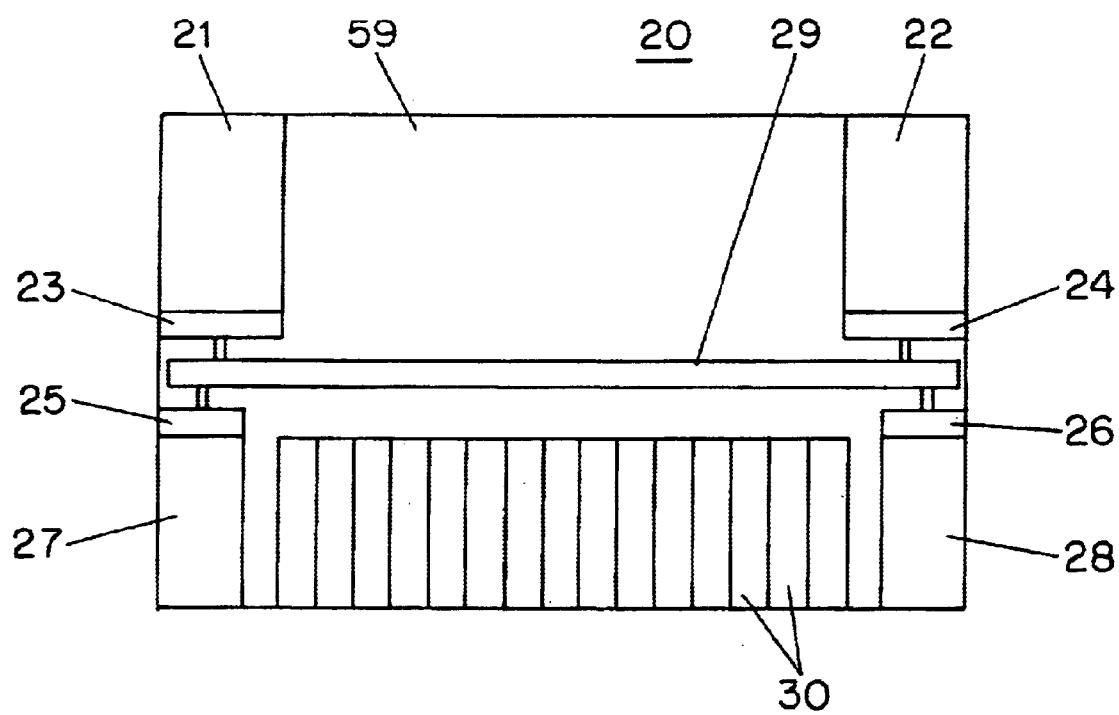
FIG. 1 is a plan view of some of the elements of a high-performance data storage system.

FIG. 1 is a plan view of some of the elements of a high-performance data storage system 20. Perhaps most visible to a user are the multiplicity of disk drives 30. These drives 30 are preferably mounted in drive carriers which slide into carrier positions in an enclosure 59. Enclosure 59 is typically made of metal for reasons of strength as well as RF containment.

Each drive 30 has an electrical connection with a mother board 29, the connectors omitted for clarity in FIG. 1. The electrical connection includes power as well as data and control lines. The drives 30 are of a type having two high-speed serial data ports, such as Fibre Channel ports. (The two high-speed serial ports are exemplified by lines 37, 38 in FIG. 2.) The two data ports provide redundant ways of getting data into and out of the drive 30. In an exemplary embodiment there are often fourteen drives 30.

Also included in the high-performance data storage system 20 are preferably redundant power supplies and redundant cooling fans, all omitted for clarity in FIG. 1. Plenums are provided to guide cooling air to appropriate regions within the enclosure 59, and holes of particular sizes are preferably provided in the mother board 29 to permit cooling air to pass to disk drives 30 and other components on the same side of the mother board 29 as the disk drives 30.

I/O connectors 23, 24 on the mother board receive I/O modules 21, 22. Loop Redundancy Circuitry (LRC) modules 27, 28 are plugged into connectors 25, 26. Communications means provide connections between I/O modules 21, 22 and equipment external to the enclosure 29, which communications means are omitted for clarity in FIG. 1. The communications means may desirably be metallic fibre channel cables or optical fiber carrying fibre channel signals.

Figure 2:
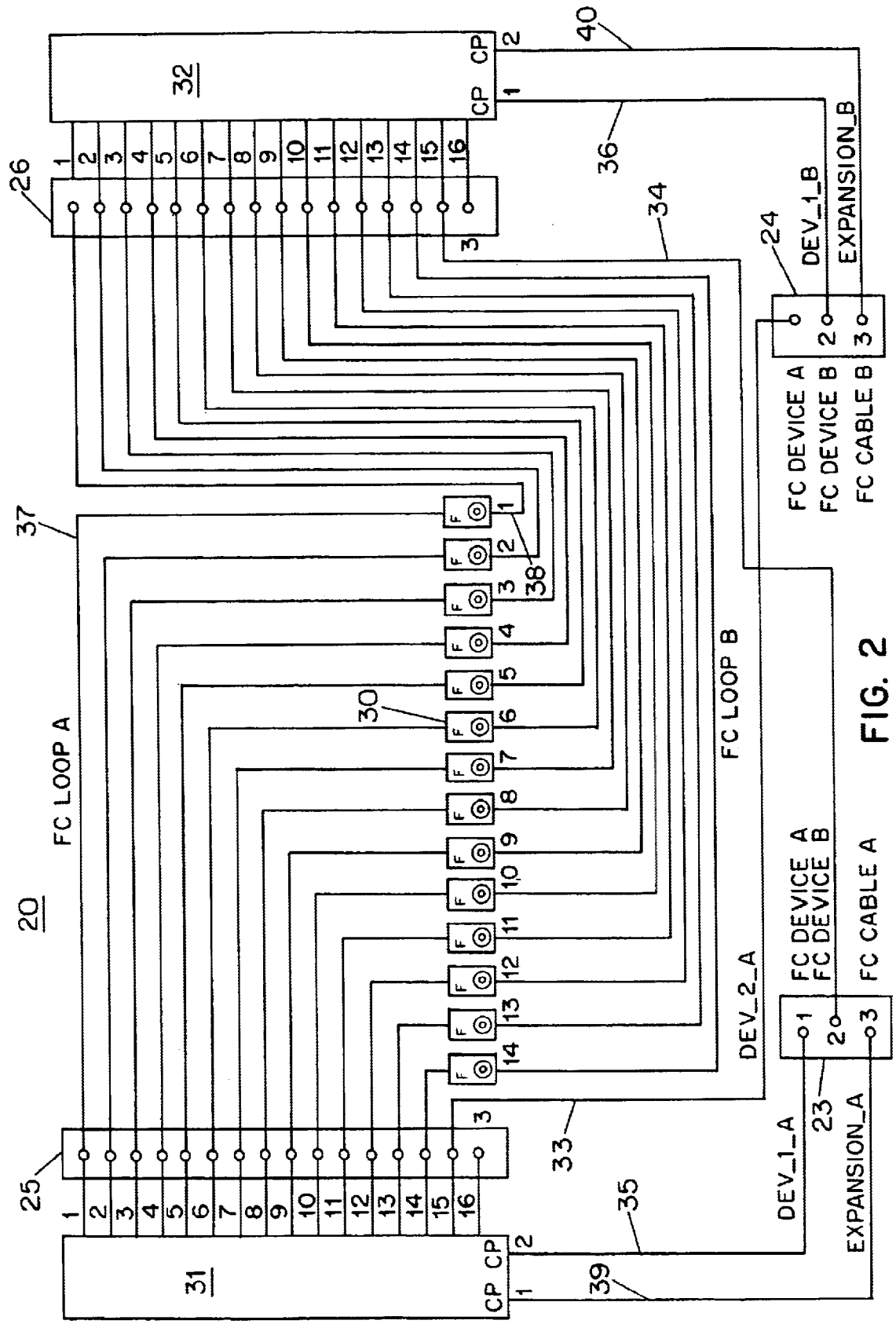
FIG. 2 is a functional block diagram showing system topology of the system according to the invention.

Turning now to FIG. 2 is a functional block diagram showing system topology of the system according to the invention. As was mentioned above, each disk drive 30 has two high-speed serial ports 37, 38. In a prior art system, all of the first high-speed serial ports 37 may be connected to a single I/O module 23, and all of the second high-speed serial ports 38 may be connected to a single I/O module 24. Again, as mentioned above, the high-speed serial lines preferably are fibre channel lines. In such a prior art system, most single point failures would affect at most one of the two fibre channel loops. But in such a prior art system, loss of an I/O module loses all connectivity to one of the fibre channel loops. This leaves the system vulnerable in the event of further problems in the other of the two fibre channel loops.

Returning to the system according to the invention, in FIG. 2 it is seen that all of the first high-speed serial data ports 37 are connected through a connector 25 to a data multiplexer 31. In the preferable arrangement the data ports 37 are fibre channel ports and the multiplexer 31 is a fibre channel multiplexer with eighteen ports described in some detail below. Likewise the data ports 38 are fibre channel ports and the multiplexer 32 is an eighteen-port fibre channel multiplexer. First multiplexer 31 has high-speed serial data connections 35 and 39 to the first I/O connector 23 and thus to the first I/O module, omitted for clarity in FIG. 2. Second multiplexer 32 has high-speed serial data connections 36 and 40 to the second I/O connector 24 and thus to the second I/O module, also omitted for clarity in FIG. 2.

Figure 3:
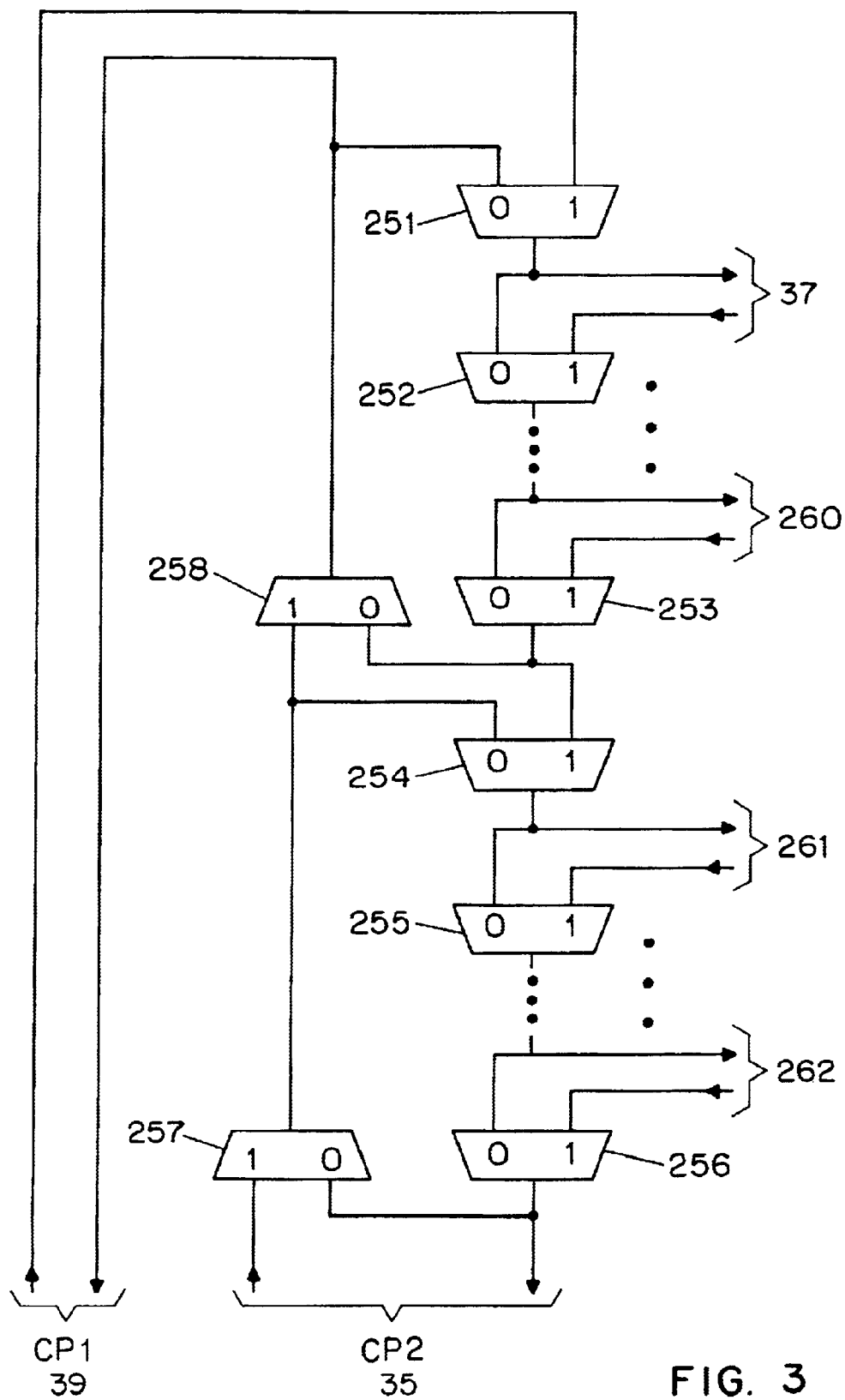
FIG. 3 is a functional block diagram of a typical fibre channel multiplexer as might be inserted into slot 31 or 32 of FIG. 2.

Turning now to FIG. 3, what is shown is a typical fibre channel multiplexer 250 which might be inserted into connector slots 31 or 32. The multiplexer 250 is shown as inserted into slot 31 but would be similarly configured in slot 32. At the lower left of FIG. 3 is the cable port 1 which is line 39 (see FIG. 2). At the lower right of FIG. 3 is the cable port 2 which is line 35 (see FIG. 2). At the upper left of FIG. 3 is high-speed line 37 (see FIG. 2). Below line 37 are six more high-speed lines omitted for clarity in FIG. 3, then lines 260 and 261, then six more high-speed lines omitted for clarity in FIG. 3, then line 262. This preferably provides sixteen lines in addition to lines 39, 35, adding up to eighteen lines.

As mentioned above, in an exemplary embodiment the high-speed lines are fibre channel lines. Each fibre channel line in this arrangement has an "in" portion and an "out" portion; in FIG. 3 at line 37 for example this is denoted by two arrows one pointing to the right and the other to the left. The "in" portion is itself a two-conductor (differential) signal, as is the "out" portion. In an exemplary embodiment, then, the line 37 is four metallic conductors, and the same may be said for each of the other seventeen ports, yielding 72 metallic conductors. Other conductors, omitted for clarity in FIGS. 2 and 3, permit control signals to be communicated to the multiplexer 250 to control circuit elements therein.

Figure 4:
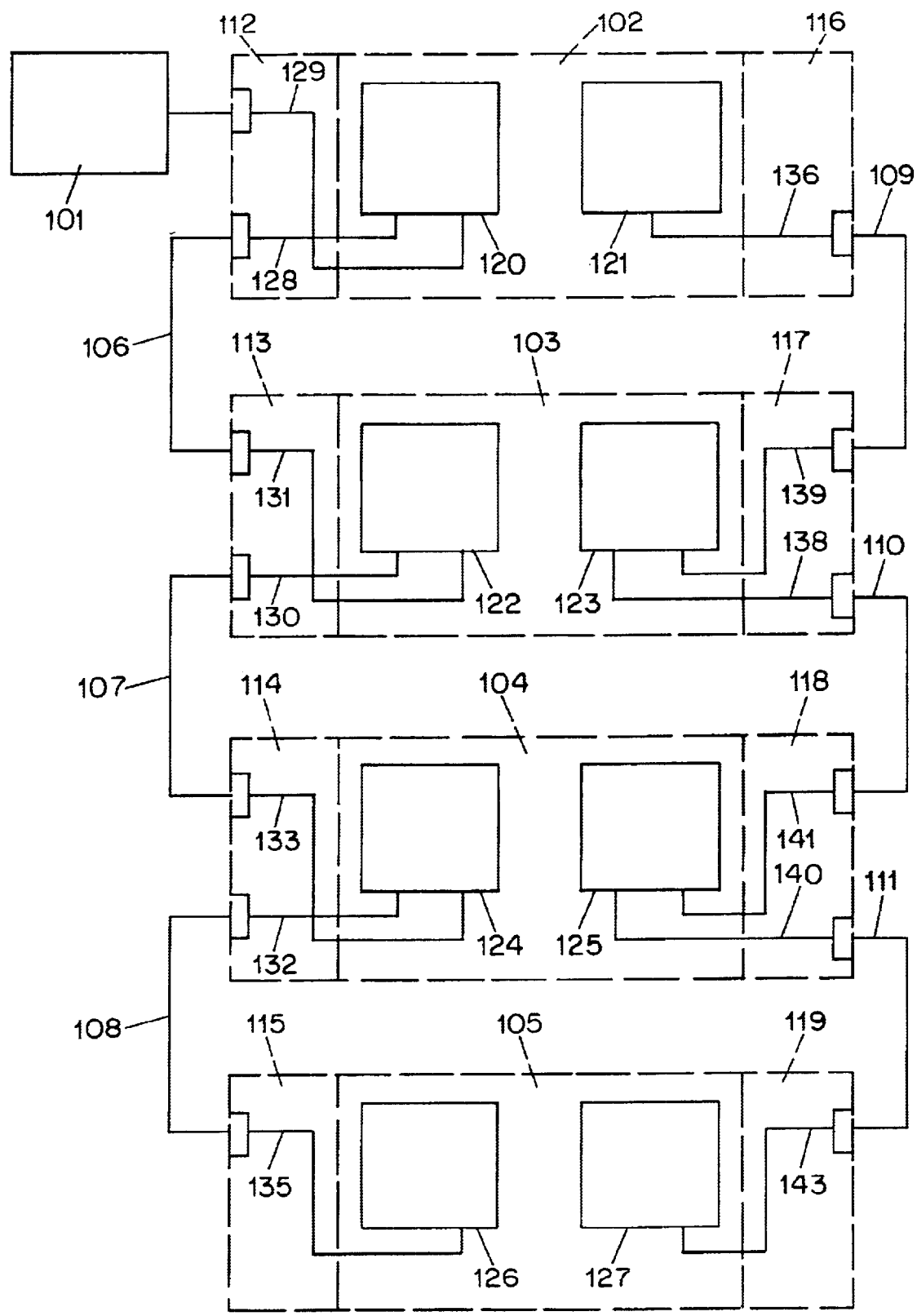
FIG. 4 shows several systems such as those of FIGS. 1 and 2 arranged in a cascaded or daisy-chained fashion.

The multiplexer 250 will preferably be set up with each of its multiplexers 251 through 258 in the "1" state. In this way the fibre channel signal "in" at line 39 passes to multiplexer 251, then to the device at line 37, then back into the multiplexer 250 on line 37 "in", then to multiplexer 252, then through more circuitry omitted for clarity in FIG. 3, then to line 260 "out", then to line 260 "in", and so on to line 35 "out". Line 35, "in" passes through multiplexers 257, 258 to line 39 "out". In this way, the cable ports 39, 35 provide a convenient way to "daisy chain" storage devices 102 through 105 as shown in FIG. 4.

The internal multiplexers 251 through 258 in FIG. 3 are controllable to bring about numerous desirable functions. For example, if it is suspected that one of the disk drives 30 (FIG. 2) is "babbling" (transmitting spurious fibre channel signals), then the corresponding multiplexer 252 through 256 may be switched to the "0" position, which accomplishes a port bypass. For this reason the circuitry 250 is often termed a "port bypass" circuit.

In a preferred embodiment, circuitry 250 permits partitioning the sixteen ports into two groups of eight. Multiplexers 254, 258 can be switched to "0" so that port 39 connects to the first eight disk drive ports while port 25 connects to the second eight disk drive ports.

In a preferred embodiment, circuitry 250 permits preserving a fibre channel loop even in the absence of a connection at line 39 or 25. For example if there is no connection (or no reliable connection) at line 39, multiplexer 251 may be set to "0" to complete a loop for line 25. Similarly if there is no connection (or no reliable connection) at line 35, multiplexer 257 may be set to "0" to complete a loop for line 39.

Those skilled in the art can readily devise obvious variations on the circuitry and function of the circuit element 250 which would differ from what has been described but which would nonetheless permit functioning of the circuitry and topology of FIG. 2 with its inventive benefits.

For example a crosspoint switching matrix could be employed, providing a full mesh of possible cross connections among the various fibre channel devices connected thereto.

Returning to FIG. 2, importantly, in the system according to the invention, an otherwise unused port of the first multiplexer 31 is connected via high-speed data connection 33 to the second I/O port 24 and thence to the second I/O module. Likewise, an otherwise unused port of the second multiplexer 32 is connected via high-speed data connection 34 to the first I/O port 23 and thence to the first I/O module.

FIG. 4 shows a "daisy chained" arrangement of storage apparatus 102 through 105. I/O modules 112 through 119 are shown, connecting to multiplexers (also called loop bypass circuits) 120 through 127. These multiplexers are preferably of the arrangement 250 shown in FIG. 3, and are plugged in at positions 31 and 32 of FIG. 2. A fibre channel host 101 is connected through a first I/O module 112 at port 129. This is in turn connected to line 35 (FIG. 2) which forms a loop with the fibre channel loops "A" of the disk drives 30. The loop continues at loop expansion line 39 (FIG. 2) to port 128 (FIG. 4). Fibre channel line 106 passes the daisy chain to storage apparatus 103. In this way the fibre channel loop is expanded to multiple storage devices 104, 105.

Each of the disk drives 30 (omitted for clarity in FIG. 4) has two fibre channel loops, denoted "A" and "B", also omitted for clarity in FIG. 4. The "A" loops connect with loop bypass or multiplexer circuits 120, 122, 124, 126. The "B" loops connect with loop bypass or multiplexer circuits 121, 123, 125, 127. The latter are daisy-chained with lines 109 through 111. This permits the host 101 to obtain highly reliable communication with the disk drives 30 by means of either of two fibre channel loops.

Figure 5:
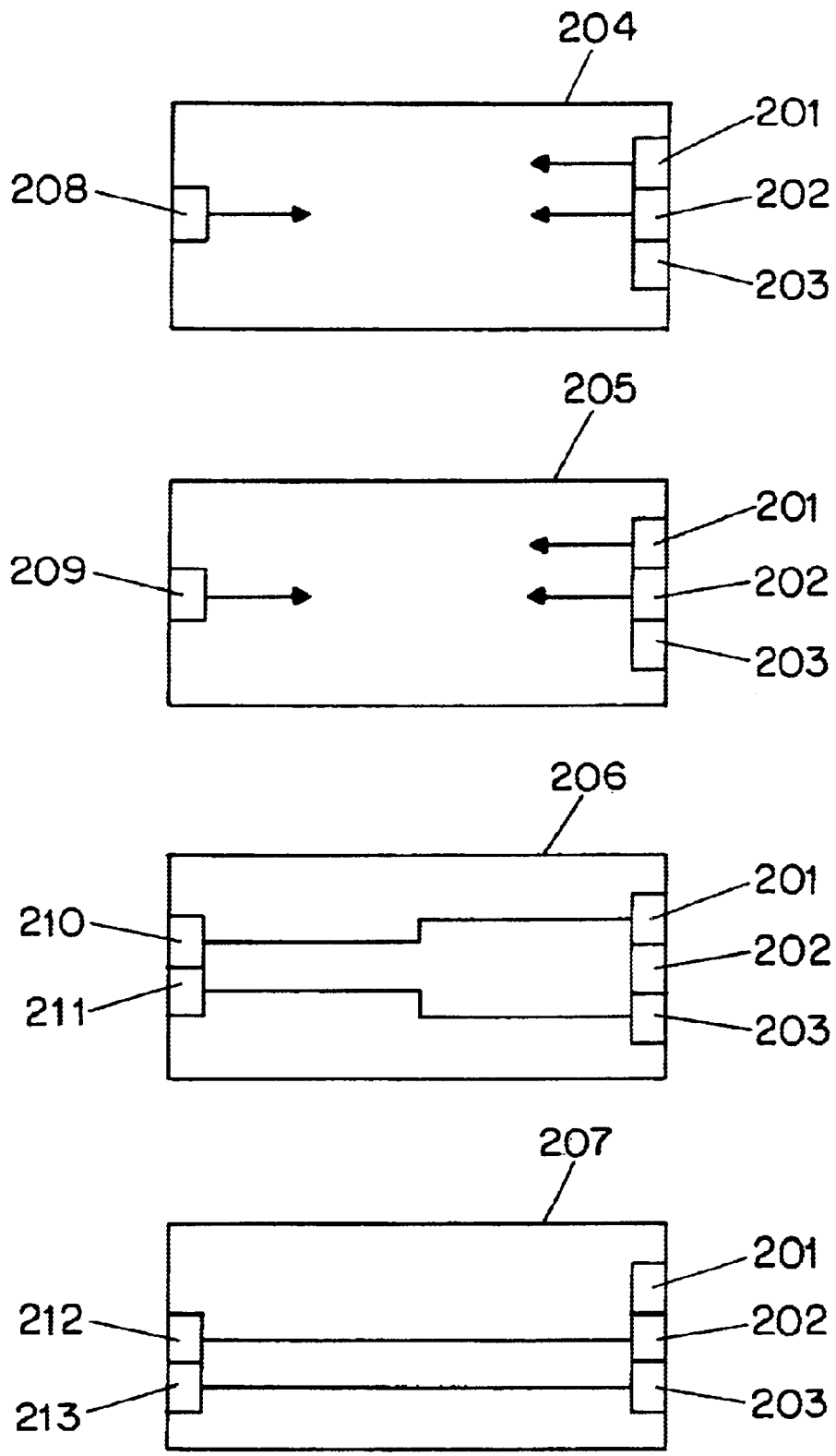
FIG. 5 shows a variety of I/O modules which may be inserted into slots 23 or 24 of FIG. 2.

The versatility of the I/O slots 23, 24 may now be more fully appreciated in connection with FIG. 5. FIG. 5 shows four different I/O module configurations 204 through 207, each of which plugs into an I/O slot 23 or 24 (FIG. 2) with connections 201, 202, 203 (FIG. 5). Each I/O module has connections to external equipment by means of external ports 208 through 213.

Module 204 shows a typical RAID controller. It connects to the fibre channel A and B loops through channels 201, 202 (in FIG. 2 these are lines 35 and 34, or lines 33 and 36). The connection 208 goes to a fibre channel host, which might be a fibre channel switch forming part of a storage area network, or might be some other arbitrary fibre channel device.

Module 205 shows a typical NAS controller. It connects to the fibre channel A and B loops through channels 201, 202 (in FIG. 2 these are lines 35 and 34, or lines 33 and 36). The connection 209 is a network connection.

Module 206 and 207 show generalized I/O expansion modules of a type which may conveniently be used for "daisy chaining" storage devices as shown in FIG. 4. The modules 206 and 207 are electrically and mechanically identical, but self-configure when inserted into I/O slots 23 or 24 (FIG. 2). The self-configuration is preferably accomplished by means of a signal at pin 327 (FIG. 6). The module 206 has "learned" from pin 327 that it is in slot A (slot 23 in FIG. 2). The module 207 has "learned" from pin 327 that it is in slot B (slot 24 in FIG. 2). Module 206, as shown in FIG. 5, receives the "A" loop at position 201 and the expansion loop at position 203 (lines 35, 29 in FIG. 2). Module 207, as shown in FIG. 5, receives the "B" loop at position 202 and the expansion loop at position 203 (lines 35, 29 in FIG. 2).

Turning now to FIG. 6, what is shown is a preferred pinout for the I/O connector 23, 24. Pins 313 are ground. Pins 314, 316 and 322 are precharge voltages of 5, 12, and 3 volts respectively. Pins 315, 317, and 323 are working voltages of 5, 12, and 3 volts respectively. Pins 313 are preferably the longest pins, making connection first to the mating connector. Pins 314, 316 and 322 are not as long as pins 313 but are longer than the remaining pins. The purpose for this is to provide a ground connection first as the I/O module is slid into place, then to provide the DC precharge voltages, and finally to provide working voltages and data and control signals.

Pins 301 and 302 are the inbound fibre channel signals (positive and negative) for the expansion line 39 or 40 (FIG. 2). Pins 303 arid 304 are the outbound fibre channel signals (negative and positive) for the expansion line 39 or 40 (FIG. 2). Stated differently, these four lines are collectively shown in FIG. 2 as line 39 or 40.

Pins 305 and 306 are the inbound fibre channel signals (positive and negative) for the crossover line 33 or 34 (FIG. 2). Pins 307 and 308 are the outbound fibre channel signals (negative and positive) for the crossover line 33 or 34 (FIG. 2). Stated differently, these four lines are collectively shown in FIG. 2 as line 33 or 34.

Pins 309 and 310 are the inbound fibre channel signals (positive and negative) for the data line 35 or 36 (FIG. 2). Pins 311 and 312 are the outbound fibre channel signals (negative and positive) for the data line 35 or 36 (FIG. 2). Stated differently, these four lines are collectively shown in FIG. 2 as line 35 or 36.

Pin 327 is a pin which is high or low to denote I/O slot A or B. An I/O module inserted into an I/O slot can thus learn from pin 327 whether the module is in slot A or B. In FIG. 5, for example, this pin determines whether an I/O module should self-configure itself as in block 206 (slot A) or block 207 (slot B).

Those skilled in the art will now appreciate the substantial availability and functionality improvements offered by this system as compared with some prior art systems. Importantly, any module inserted into an I/O slot has visibility to each of the two high-speed serial (e.g. fibre channel) loops. If the module in either I/O slot fails, the module in the other I/O slot will have the ability to maintain connectivity between the external equipment (e.g. the Host Server) and the storage devices.

This topology is thus very flexible, accommodating many computer-networking environments. By changing nothing more than the I/O modules, the system can change function from JBOD to SAN or to NAS.

Each I/O option slot accepts several OEM RAID controllers, I/O Expansion Modules, and NAS controllers. These modules are self-configuring based on the signals detected on the I/O connector (FIG. 6). The I/O expansion module preferably configures itself to provide host and expansion ports for either the fibre channel A loop (ports 37) or fibre channel B loop (ports 38) by detecting signals on the I/O connector. RAID controllers and NAS engines attach to both fibre channel loops and expand the proper loop when installed in either I/O option slot.

Those skilled in the art will have no difficulty devising myriad obvious improvements and variations, all of which are intended to fall within the scope of the invention as defined by the claims that follow.

What is claimed is:

1. A storage apparatus comprising
   a housing;
   a multiplicity of drive bays within the housing, each drive bay having a power connection and having respective first and second high-speed serial data connections;
   a first I/O slot;
   a second I/O slot;
   a first port bypass slot defining a multiplicity of ports;
   a second port bypass slot defining a multiplicity of ports;
   a multiplicity of first high-speed serial communicative means, each corresponding with one of the first high-speed serial data connections and communicatively coupling the corresponding first high-speed serial data connection with a respective port at the first port bypass slot;
   a multiplicity of second high-speed serial communicative means, each corresponding with one of the second high-speed serial data connections and communicatively coupling the corresponding second high-speed serial data connection with a respective port at the second port bypass slot;
   a third high-speed serial communicative means communicatively coupling a port at the first port bypass slot with a first port at the first I/O slot;
   a fourth high-speed serial communicative means communicatively coupling a port at the second port bypass slot with a second port at the first I/O slot;
   a fifth high-speed serial communicative means communicatively coupling a port at the first port bypass slot with a first port at the second I/O slot; and
   a sixth high-speed serial communicative means communicatively coupling a port at the second port bypass slot with a second port at the second I/O slot.

2. The storage apparatus of claim 1 wherein the high-speed communicative means are electrical conductors.

3. The storage apparatus of claim 1 wherein the high-speed communicative means are optical fibers.

4. The storage apparatus of claim 1 further comprising first and second multi-port fibre channel multiplexers connected respectively with the first and second port bypass slots.

5. The storage apparatus of claim 4 wherein the first and second multi-port fibre channel multiplexers each have sixteen ports.

6. The storage apparatus of claim 1 wherein the number of drive bays is greater than twelve.

7. The storage apparatus of claim 1 further comprising a multiplicity of disk drives, each disk drive connected with a respective drive bay.

8. The storage apparatus of claim 1 further comprising first and second I/O modules connected respectively with the first and second I/O slots, each of said I/O modules characterized as Just a Bunch of Drives modules.

9. The storage apparatus of claim 1 further comprising first and second I/O modules connected respectively with the first and second I/O slots, each of said I/O modules characterized as Storage Area Network modules.

10. The storage apparatus of claim 1 further comprising first and second I/O modules connected respectively with the first and second I/O slots, each of said I/O modules characterized as Network Attached Storage modules.

11. The storage apparatus of claim 1 further comprising:
    a seventh high-speed serial communicative means communicatively coupling a port at the first port bypass slot with a third port at the first I/O slot; and
    an eighth high-speed serial communicative means communicatively coupling a port at the second port bypass slot with a third port at the second I/O slot.

12. A storage apparatus comprising:
    a housing;
    a multiplicity of drive bays within the housing, each drive bay having a power connection and having respective first and second high-speed serial data connections;
    a first I/O slot;
    a second I/O slot;
    a first fibre channel multiplexer defining a multiplicity of ports;
    a second fibre channel multiplexer defining a multiplicity of ports;
    a multiplicity of first high-speed serial communicative means, each corresponding with one of the first high-speed serial data connections and communicatively coupling the corresponding first high-speed serial data connection with a respective port at the first fibre channel multiplexer;
    a multiplicity of second high-speed serial communicative means, each corresponding with one of the second high-speed serial data connections and communicatively coupling the corresponding second high-speed serial data connection with a respective port at the second fibre channel multiplexer;
    a third high-speed serial communicative means communicatively coupling a port at the first fibre channel multiplexer with a first port at the first I/O slot;
    a fourth high-speed serial communicative means communicatively coupling a port at the second fibre channel multiplexer with a second port at the first I/O slot;
    a fifth high-speed serial communicative means communicatively coupling a port at the first fibre channel multiplexer with a first port at the second I/O slot; and
    a sixth high-speed serial communicative means communicatively coupling a port at the second fibre channel multiplexer with a second port at the second I/O slot.

13. The storage apparatus of claim 12 wherein the high-speed communicative means are electrical conductors.

14. The storage apparatus of claim 12 wherein the high-speed communicative means are optical fibers.

15. The storage apparatus of claim 12 wherein the first and second fibre channel multiplexers each have sixteen ports.

16. The storage apparatus of claim 12 wherein the number of drive bays is greater than twelve.

17. The storage apparatus of claim 12 further comprising a multiplicity of disk drives, each disk drive connected with a respective drive bay.

18. The storage apparatus of claim 12 further comprising first and second I/O modules connected respectively with the first and second I/O slots, each of said I/O modules characterized as Just a Bunch of Drives modules.

19. The storage apparatus of claim 12 further comprising first and second I/O modules connected respectively with the first and second I/O slots, each of said I/O modules characterized as Storage Area Network modules.

20. The storage apparatus of claim 12 further comprising first and second I/O modules connected respectively with the first and second I/O slots, each of said I/O modules characterized as Network Attached Storage modules.

21. The storage apparatus of claim 12 further comprising:
- a seventh high-speed serial communicative means communicatively coupling a port at the first fibre channel multiplexer with a third port at the first I/O slot; and
- an eighth high-speed serial communicative means communicatively coupling a port at the second fibre channel multiplexer with a third port at the second I/O slot.

22. A method for use with a system comprising a multiplicity of disk drives within a housing, each disk drive having first and second respective high-speed serial ports, the system further comprising first and second I/O modules within the housing and selectively communicatively coupled with the first and second respective high-speed serial ports, the method comprising the steps of:
- selectively communicatively coupling the first I/O module to the first respective high-speed serial ports, thereby providing high-speed serial connectivity between the first respective high-speed serial ports and equipment external to the housing;
- selectively communicatively coupling the second I/O module to the second respective high-speed serial ports, thereby providing high-speed serial connectivity between the second respective high-speed serial ports and equipment external to the housing; and
- in the event of failure of the first I/O module, selectively communicatively coupling the second I/O module to the first respective high-speed serial ports, thereby providing high-speed serial connectivity between the first respective high-speed serial ports and equipment external to the housing, and selectively communicatively coupling the second I/O module to the second respective high-speed serial ports, thereby providing high-speed serial connectivity between the second respective high-speed serial ports and equipment external to the housing.

* * * * *